United States Patent [19]

Caillé

[11] Patent Number: 4,496,593
[45] Date of Patent: Jan. 29, 1985

[54] ROLLED CHEESE AND PROCESS FOR PRODUCING THE SAME

[75] Inventor: Michel Caillé, Sainte-Solange, France

[73] Assignee: Laiteris Hubert Triballat, d'Angillon, France

[21] Appl. No.: 444,382

[22] Filed: Nov. 26, 1982

Related U.S. Application Data

[63] Continuation of Ser. No. 247,208, Mar. 24, 1981, abandoned.

[30] Foreign Application Priority Data

Apr. 8, 1980 [FR] France ................................ 80 07844

[51] Int. Cl.³ .......................... A23C 19/00; A23P 1/00
[52] U.S. Cl. ...................................... 426/89; 426/289; 426/297; 426/582; 426/130
[58] Field of Search ................. 426/89, 289, 302, 297, 426/36, 130, 582, 517, 396, 124, 512

[56] References Cited

U.S. PATENT DOCUMENTS

| | | | |
|---|---|---|---|
| 3,172,372 | 3/1965 | Packman | 426/297 |
| 3,798,343 | 3/1974 | Vitale | 426/297 |
| 3,904,772 | 9/1975 | Moegle | 426/289 |
| 3,966,045 | 6/1976 | Perdue | 426/124 |
| 4,012,530 | 3/1977 | Holden | 426/124 |

FOREIGN PATENT DOCUMENTS 1039039  10/1953  France .

OTHER PUBLICATIONS

Cheese, by J. G. Davis, vol. III, pp. 831–832, 1976.

*Primary Examiner*—George Yeung
*Attorney, Agent, or Firm*—Parkhurst & Oliff

[57] ABSTRACT

A rolled cheese and a process for making the cheese is described. The cheese comprises a layer of fresh cheese curd coated with flavoring, such as herbs, which is rolled into a spiral. The fresh cheese curd is neither cooked nor kneaded, and the resulting rolled cheese has two distinct layers which each contain a distinctive taste.

11 Claims, 4 Drawing Figures

ROLLED CHEESE AND PROCESS FOR PRODUCING THE SAME

This is a continuation of application Ser. No. 247,208 filed Mar. 24, 1981, now abandoned.

In order to prepare a cheese which is speckled with herbs, it is known to knead a mixture of fresh or soft curds and herbs. The distribution of the herbs, which are finely divided in the mass, is excellent. However, this kneading produces a short-textured curd which becomes granular and sticky, crumbles when cut and is not popular with consumers.

French utility certificate No. 78.34570 describes a block cheese made from processed cheese and a layer of natural cheese. The processed cheese holds together the layer of natural cheese which is more crumbly. This block of cheese is not to the taste of those who like natural cheeses or cheeses made from fresh or soft curds which have not been subjected to kneading or cooking. Moreover, it does not contain any nondairy substances or flavorings such as pepper, herbs, walnuts, hazelnuts or ground almonds, raisins, etc.

The invention overcomes these disadvantages by providing a cheese made from fresh curds which have not been subjected to any kneading or cooking. As a result, the cheese's qualities of flavor, and appearance are unimpaired but the cheese is nevertheless flavored with a flavoring which is adequately distributed in the mass, but remains distinct from the cheese, so that the mellow flavor of the cheese and the pronounced flavor of the herbs are tasted separately in a kneaded product the two flavors combine to form a single flavor.

Moreover, the production of a cheese flavored with garlic and fine herbs without kneading gives a firmer texture than usual. This cheese can therefore be placed on a cheese board without any difficulty, unlike kneaded cheeses containing garlic and fine herbs.

The cheese according to the invention, having fresh or soft curds, incorporates a coating of flavoring rolled in a spiral. Preferably, the layer of curds is also rolled in a spiral surrounding the coating of flavoring, in the manner of a Swiss roll.

The regular variation in the length of the polar radius of the spiral of the coating ensures that the flavoring is distributed in the cheese in a sufficiently homogeneous manner to ensure that the flavoring is found in each mouthful. However, since the flavoring does not have to be finely divided and distributed in the mass of the curds, there is no need for the curds to be either kneaded or even broken up. With some curds, the layer of curds may not stay in a spiral to start with. This disadvantage is overcome by the use of a casing, which may be inedible or edible, which holds the outer coil of the layer of curds in place and may also serve as a wrapper to protect the cheese.

Rolled cheese made from fresh curds is particularly preferred.

The invention also relates to a process for preparing rolled cheese which comprises the forming of a continuous, unbroken, non-kneaded layer of fresh or soft curds, placing a coating of flavoring on the layer, and rolling the layer and the coating into a spiral.

Preferably, this rolling operation is carried out when the cheese still has a moisture content greater than the level which is appropriate for consumption. When the cheese has a high moisture content, it rolls up more easily. Thus, for example, the dry extract of the curds at the time of rolling may be less than 40%, preferably less than 38%, more particularly equal to about 35%.

The term "flavoring" here refers to any edible nondairy substance, while the term "coating" does not rule out the possibility of a layer or bed of flavoring broken up into more or less thick pieces, or even a bed of separate pieces, although the coating should preferably be thin and uniform. Even when separate pieces are used, the distribution of these pieces obtained by encrusta in the layer of curds in an incomplete spiral is much greater than the distribution which would be obtained if the pieces were merely encrusted on the upper surface of a cheese, whereas, to incorporate them in the mass would involve breaking it up.

In the accompanying drawings, which are given solely by way of example,

Figure 1:
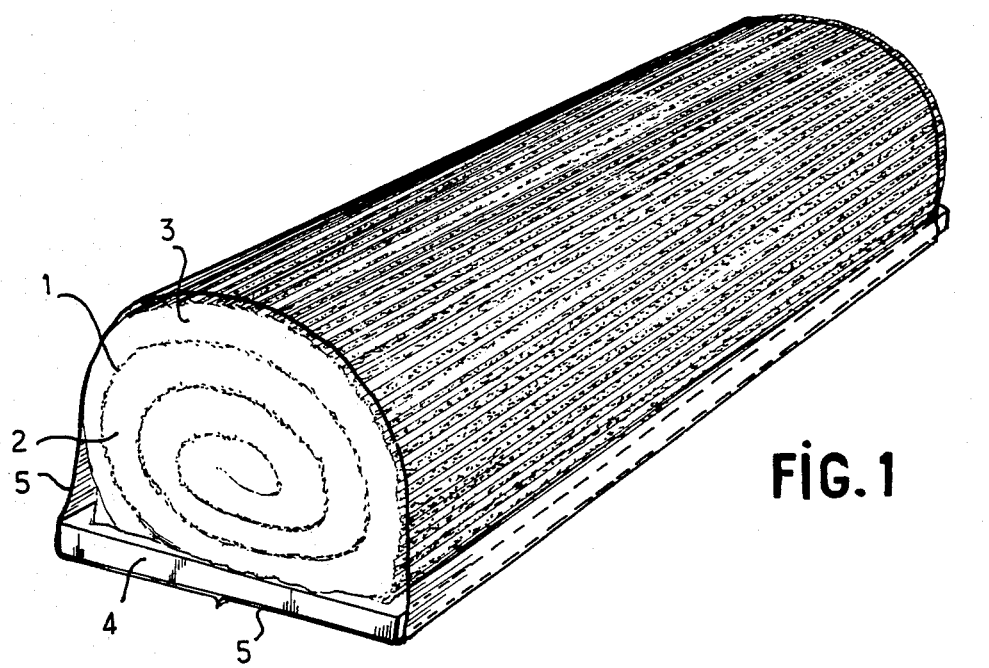
FIG. 1 is a perspective view of a cheese according to the invention.

The cheese shown in FIG. 1 has a coating 1 of flavoring rolled in a spiral and a layer 2 of fresh curds rolled in a spiral around the coating 1 and in contact therewith. The outer surface of the cheese may be surrounded by a coating 3 of flavoring. The lower surface of the cheese rests on a polystyrene sheet. The sheet 4 and the cheese are wrapped together in a wrapping 5 of heat-shrinkable film. The thermowelding line of the wrapping runs under the sheet 4. A wrapping of aluminum foil or the like could also be used.

The following example illustrates the invention.

Figure 2:
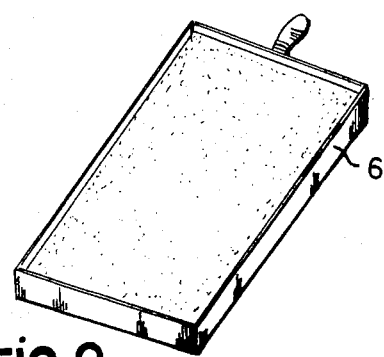
FIGS. 2 to 4 illustrate three steps of the process for preparing a cheese according to the invention.
Figure 3:
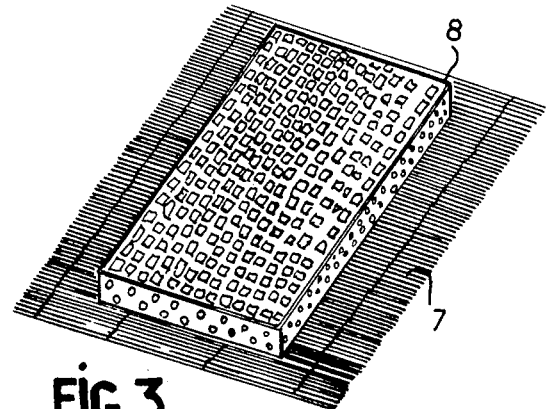
Figure 4:
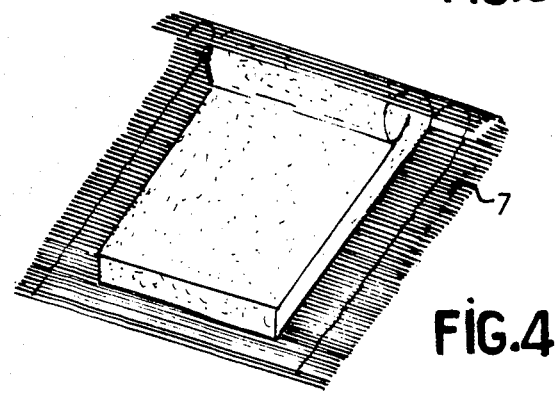

EXAMPLE (Referring to FIGS. 2 to 4 of the accompanying drawings).

Six liters of pasteurised skimmed milk and 1.5 liters of pasteurized cream are mixed together so as to obtain a fat content of 72 grams/liter. Mixing is carried out at 26° C. and Flora Danica acidic leavens and flavoring ferments are added.

The mixture is left to mature for about three hours in the container 6 shown in FIG. 2.

It is then coagulated with 0.5 cm$^3$ of rennet at between 21° C. and 25° C. in order to obtain milk curds. The coagulation process lasts about 22 hours.

A curd-cutter is used to cut the coagulated rennet up into cubes with sides of about 5 cm.

The product is then molded on a straw mat 7 (FIG. 3), which has previously been sterilized, in a metal frame 8 with perforated walls, the product on the mat then is placed on a draining tray. The curds are placed on the draining tray using a stainless steel ladle, taking care not to break them. The curds are levelled using a spatula and a sterile mat is placed on the curds before a plate weighing about 3 kg is placed on top in order to compress the curds and ensure satisfactory exudation. The product is left to drain in this way for 20 hours at ambient temperature.

Finally, the product is removed from the mold and salted. At the same time, a coating of fine herbs is spread over one side of the layer of curds, a sterile mat is placed over this side, the whole product is turned over, and another layer of fine herbs is spread over the other surface. About 20 grams of fine herbs are put on.

The dry content of the curds is 37% by weight. The curds are rolled up, using a mat, in the manner of a Swiss roll (FIG. 4).

Draining is completed in the refrigerator at a temperature of in the range from 5° C. to 7° C.

The next day, the cheese is placed on a polystyrene sheet and wrapped in a heat-shrinkable film of polyvinyl chloride. The packaged cheese is then placed in a tunnel where it is heated to between 70° C. and 75° C. for about 5 to 6 seconds. During heating the wrapping shrinks. The treatment in the oven is sufficiently rapid to ensure that the cheese itself is not heated enough to affect its quality.

The wrapped cheese is stored at between about 4° C. and 5° C.

When eaten, the curds of this rolled cheese are found to be very creamy. The cheese can be cut cleanly, is not granular, does not crumble, and is easy to spread. The flavor obtained is not that of a herb butter masking the flavor of the natural fresh cheese as found in the usual products in which milk curds are combined with a flavoring. The cheese has a solids content of at least 40% and weighs about 1.7 kg.

What I claim:

1. A rolled cheese consisting essentially of:
a layer of non-kneaded, uncooked, fresh curds and a layer of herbs placed upon the layer of fresh curds with both layers rolled together in a spiral, said rolled cheese being produced by a process consisting essentially of:
    (a) molding uncooked fresh curds into a continuous, unbroken, non-kneaded curd layer, said curds having a solids content in the range of approximately 35% to less than 40% by weight,
    (b) placing a coating of flavoring on the molded curd layer;
    (c) rolling the curd layer and the coating together into a spiral to produce a rolled product, the coating being surrounded by the curd layer; and
    (d) draining the rolled product at a temperature in the range of 5° C.-7° C.

2. A rolled cheese as defined in claim 1, said cheese being encased in an outer casing made of heat-shrinkable material which holds the rolled cheese product in place.

3. A rolled cheese as defined in claim 2, said cheese being supported on an inner sheet made of heat insulating material, below which the casing is joined by welding.

4. The rolled cheese according to claim 1, wherein said process includes the following steps:
(1) prior to molding the uncooked curds:
    mixing skimmed milk with pasteurized cream at a temperature above or about room temperature;
    coagulating the milk and cream by adding rennet to the mixture to form fresh curds;
    cutting the fresh curds into small pieces;
    placing the small pieces in a mold;
(2) after molding the fresh curds:
    removing the curd layer from the mold;
    salting the curd layer; and
(3) after draining the rolled product,
    packaging the rolled product for storage.

5. A rolled cheese according to claim 4, wherein the coagulation of the rennet occurs at a temperature in the range of 21° C.-35° C.

6. A rolled cheese as defined in claim 2, wherein said cheese is wrapped in a heat shrinkable material, then heated in the range between 70° C. and 75° C. for 5 to 6 seconds.

7. A process for producing a rolled cheese with a layer of flavoring distributed in the cheese, said process consisting essentially of:
    (a) molding uncooked fresh curds into a continuous, unbroken, non-kneaded curd layer, said curds having a solids content in the range of approximately 35% to less than 40% by weight;
    (b) placing a coating of flavoring on the molded curd layer;
    (c) rolling the curd layer and the coating together into a spiral to product a rolled product, the coating being surrounded by the curd layer; and
    (d) draining the rolled product at a temperature in the range of 5° C. to 7° C.; and
    (e) packaging the rolled product for storage.

8. A process according to claim 7, said process including the following steps:
(1) prior to molding the uncooked curds:
    mixing skimmed milk with pasteurized cream at a temperature above or about room temperature;
    coagulating the milk and cream by adding rennet to the mixture to form fresh curds;
    cutting the fresh curds into small pieces;
    placing the small pieces in a mold;
(2) after molding the fresh curds:
    removing the drained curd layer from the mold;
    salting the curd layer; and
(3) after draining the rolled product:
    packaging the rolled product for storage.

9. A process as defined in claim 7, said rolled cheese being encased in an outer casing made of heat-shrinkable material which holds the rolled cheese product in place.

10. A process as defined in claim 7, said rolled cheese being supported on an inner sheet made of heat insulating material, below which the casing is joined by welding.

11. A process according to claim 8, wherein the coagulation of the rennet occurs at a temperature in the range of 21° C.-35° C.

* * * * *